United States Patent
Schopp

(10) Patent No.: US 7,214,954 B2
(45) Date of Patent: May 8, 2007

(54) METHOD FOR OPERATING OPTICAL SENSORS

(75) Inventor: Thomas Schopp, Freiburg (DE)

(73) Assignee: Sick AG, Waldkirch (DE)

( * ) Notice: Subject to any disclaimer, the term of this patent is extended or adjusted under 35 U.S.C. 154(b) by 4 days.

(21) Appl. No.: 10/768,203

(22) Filed: Jan. 29, 2004

(65) Prior Publication Data

US 2004/0184041 A1    Sep. 23, 2004

(30) Foreign Application Priority Data

Feb. 1, 2003    (EP) .................................. 03002261

(51) Int. Cl.
- G01N 21/86    (2006.01)
- G01N 21/88    (2006.01)
- G01V 8/00     (2006.01)

(52) U.S. Cl. .................. 250/559.19; 356/625; 702/155

(58) Field of Classification Search ........... 250/559.19, 250/559.21, 559.45, 223 R, 559.26, 559.27; 356/627–629, 625, 634, 635, 379–381, 383; 702/97, 155, 156, 158, 166, 170

See application file for complete search history.

(56) References Cited

U.S. PATENT DOCUMENTS 6,373,579 B1 *   4/2002   Ober et al. ................. 356/627

2003/0001120 A1 *   1/2003   Nishiyama et al. .... 250/559.45

OTHER PUBLICATIONS

International Recommendation, OIML R 129, "Multi-dimensional Measuring Instruments," Organisation International de Metrologie Legale (International Organization of Legal Metrology), Edition 2000 (E), pp. 1-91.

Approvals Manual—Mass, Chapter 5, "Multiple Dimension Measuring Devices," Measurement Canada (Mesures Canada), 7 pgs.

* cited by examiner

Primary Examiner—Thanh X. Luu
Assistant Examiner—Suezu Ellis
(74) Attorney, Agent, or Firm—Townsend and Townsend and Crew LLP

(57) ABSTRACT

A method for operating an optical sensor for measuring a physical quantity with a defined scale value that is subject to a calibration certification. The measurement accuracy of the quantity being measured is dependent on at least one external condition, and a given scale value is used for the measurement according to the desired measurement accuracy. The scale value is appropriately changed when the measurement accuracy changes due to a change of external condition. An optoelectronic sensor has a switching arrangement for changing the scale value. The sensor is more diversified and can cover larger measurement ranges without requiring new certifications or authorizations for the different measurement ranges.

16 Claims, 2 Drawing Sheets

METHOD FOR OPERATING OPTICAL SENSORS

BACKGROUND OF THE INVENTION

The invention concerns a method for operating an optical sensor for measuring a physical quantity, as well as the corresponding sensor.

In general, one must define a so-called scale value for measurement devices with which a physical parameter is being measured and which operate pursuant to a calibration certificate. The scale value corresponds to the smallest indicated dimensional unit and is used to define the measurement accuracy. The measurement results may only be indicated in multiples of the scale value. By definition, scale values should only be selected in steps of 1, 2 and 5 times $10^n$ (n is an integer). The definition is mandated by national authorities, for example, in Germany, by the Physikalisch Technische Bundesanstalt, which follow the recommendations of the OIML (International Organization of Legal Metrology).

Each calibrated measurement device has one of these scale values and is suitable for applications with a measurement accuracy corresponding to that scale value.

A problem occurs when the measurement accuracy cannot be constant because it is influenced by external conditions. For example, such a situation is encountered when making automatic length or volume measurements with an optoelectronic sensor, such as a laser scanner, of goods being transported by a conveyor. The length measured in the transport direction by a stationary sensor depends on the transport speed. Upon change in that speed, it might become necessary to employ a different sensor calibrated with a different scale value. Thus, the measurement layout at the conveyor either has a limited range of application or it must have several sensors with different scale values, which is correspondingly expensive and cumbersome.

SUMMARY OF THE INVENTION

Based on this state of the art, it is an object of the invention to provide an improved method and sensor which are more diversified and can cover larger measurement ranges.

In the method of the present invention for measuring a physical quantity by means of a defined scale value governed by a calibration certificate, wherein the measurement accuracy of the quantity being measured depends at least on one external condition and a particular scale value is used for the measurement depending on the measurement accuracy, the scale value of the optoelectronic sensor can be switched in response to a change in the measurement accuracy caused by an external condition.

In this way, a large measurement range can be covered by a single sensor. The use of different sensors for different conveyance speeds, for example, is no longer necessary.

Since the sensors used, for example on conveyors for the measurement of volume, require a certification, it is additionally no longer necessary to certify several systems for different transport speeds when using the method and/or the sensor of the present invention. It is sufficient to certify a system with a single optoelectronic sensor made according to the invention, whose scale value can be switched.

It should be pointed out that the conveyance speed is only a convenient example of many parameters for the external condition so that the advantages can be more clearly explained. The present invention can also be used with other systems with calibratable quantities.

Thus, in one embodiment of the invention, the external condition may be derived from a geometrical property of the object. For example, if it is necessary to measure the volume of not only square-shaped luggage and packages, but also bags or pouches of essentially any given shape on a conveyor belt at an airport or the like, one can use the invention, i.e. use one and the same sensor, to measure both the square-shaped goods with high measurement precision as well as bags with a lesser measurement accuracy. In the past, such an arrangement required different measurement systems. With the invention, this task can be accomplished with a single sensor or sensor system.

The same benefits occur when measuring goods that are separated from each other, i.e. individual goods arranged at intervals from each other, such as pieces of luggage or packages, with a high measurement accuracy, as well as when measuring goods with lesser accuracy when they touch or overlap each other. The external condition then is a function of the position of the object. The position of the objects, whether they are touching, lying next to each other, are stacked, or lie one on top of the other, can also be automatically detected by the sensor, as is described, for example, in published German patent application DE 102 26 663.

For certain arrangements it may alternatively be advantageous to enter the external condition into the sensor manually, rather than automatically.

Especially when the external condition is detected automatically, it is advantageous that the scale value is also switched automatically as a function of the external condition, for then no manual intervention is required and the entire measurement process occurs automatically with the desired measurement accuracy.

Advantageously, and as already mentioned with reference to one embodiment of the invention, at least one parameter that represents the external condition is detected and the scale value is automatically switched when a defined change in the parameter occurs. The parameter in one preferred usage of the invention is the transport speed of a conveyor and the sensor measures at least one dimension, such as the length of the goods being transported.

An optoelectronic sensor of the invention for measuring the physical quantity has means of detecting the physical quantity in dimensional units of a calibratable scale value and includes an arrangement for switching the scale value.

Advantageously, the scale value can be automatically switched, so that no manual intervention is necessary, e.g. upon change in the transport speed or when the goods being measured have different shapes or positions. Then, regardless of the external condition, the correct quantity will be measured with the desired measurement accuracy.

In order that the sensor can itself and preferably automatically derive the external condition from a geometrical property of the object, or from the position of the object in the embodiments of the invention already described above, a corresponding arrangement is included in the sensor. Such an arrangement is described in the already mentioned DE 102 26 663 publication, to which reference is hereby made, and can consist of electronic components and/or corresponding software.

When the external condition can be represented by a parameter, an arrangement is advantageously provided for detecting this parameter.

In a simple example of usage, this parameter is the speed of a conveyor and the sensor measures at least one dimension, e.g. the length of goods on the conveyor.

The invention is explained below in more detail.

DESCRIPTION OF THE PREFERRED EMBODIMENTS

Figure 1:
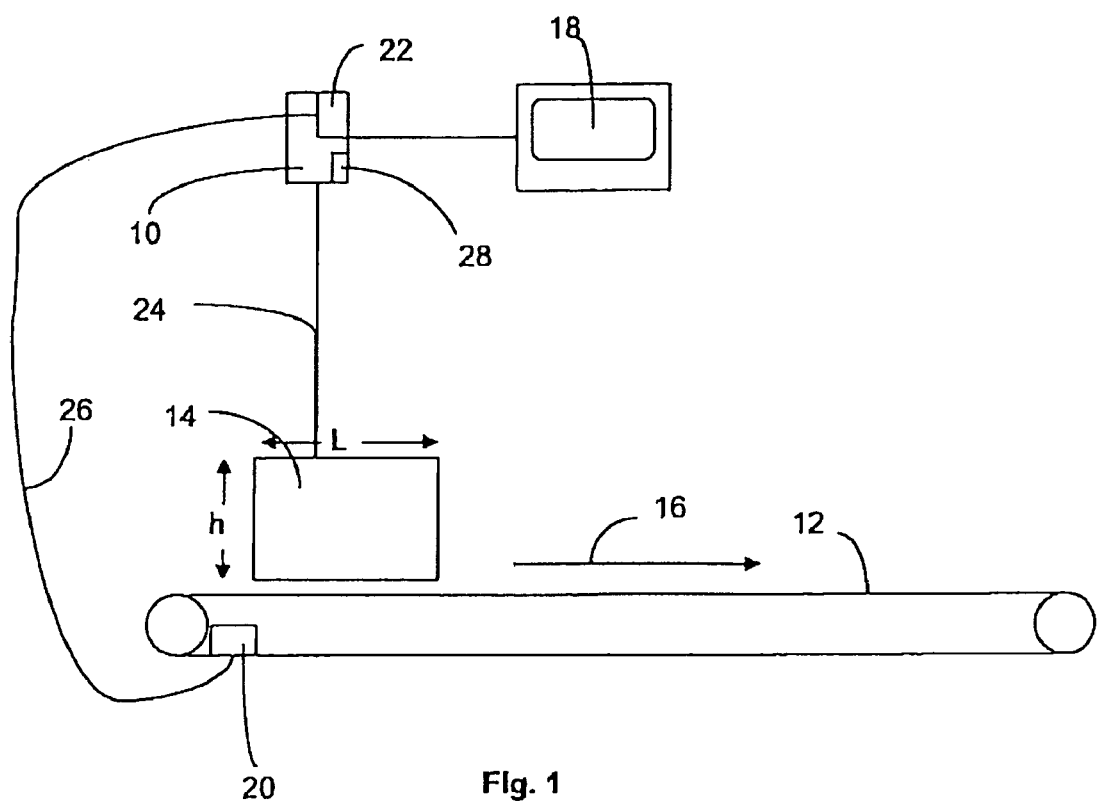
FIG. 1 is a layout for measurement of geometrical dimensions of goods on a conveyor with an optoelectronic sensor made according to the invention.

An optoelectronic sensor 10 according to the invention is arranged above a conveyor 12, on which goods such as packages 14 are being transported in any desired direction 16. The packages 14 are automatically measured by the sensor 10 during their transport to determine their volume. The measurement results can be indicated on a display unit 18 and/or they can be fed to a suitable signal output for further processing.

The optoelectronic sensor 10 can be a laser scanner, such as is marketed by the assignee of this invention, SICK AG of Germany, under the designation LMS 200, which scans the package 14 in familiar manner with a laser beam 24. The volume can ultimately be determined from the angle and distance information of the reflected laser beam.

When determining the volume of a square-shaped package 14, it is necessary to determine its height h, width and length L. The accuracy of the length measurement in the transport direction 16 is, as mentioned above, dependent upon the transport speed fg. Since measurement devices for the determination of volume require calibration certificates, such as specified in the German Calibration Statute or the Canadian Weight and Measurement, a scale value as discussed above is defined.

Furthermore, a device or arrangement 20 is provided for detecting the speed of the conveyor, so that a signal corresponding to the speed fg can be fed over a line 26 to the optoelectronic sensor 10, or to an evaluation unit assigned to the sensor. The device 20 can be a separate part of the measurement arrangement, or it can be part of the optoelectronic sensor 10. Furthermore, a switch 22 is provided for switching the scale value as a function of the transport speed fg.

Figure 2:
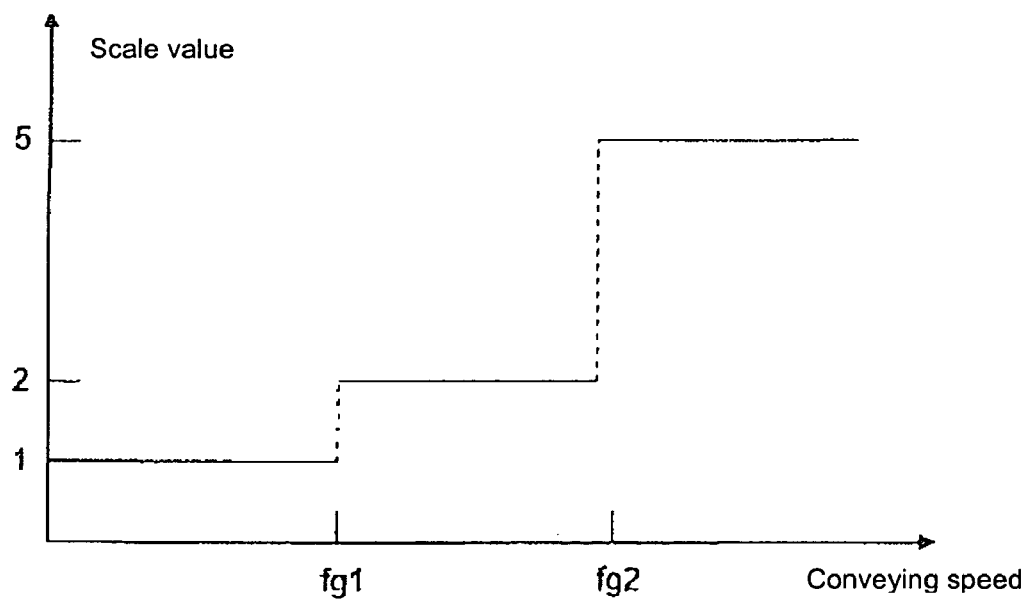
FIG. 2 is a diagram that illustrates the dependency of a scale value on the transport speed of the conveyor.
Figure 3:
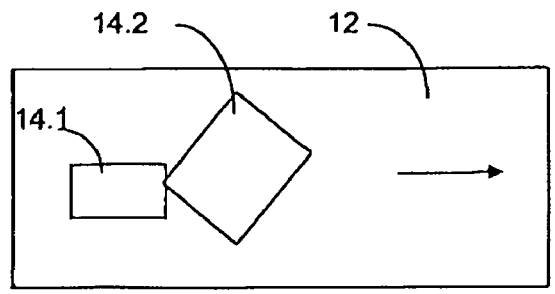
FIGS. 3–6 are top views which show alternative arrangements of the goods on the conveyor.
Figure 4:
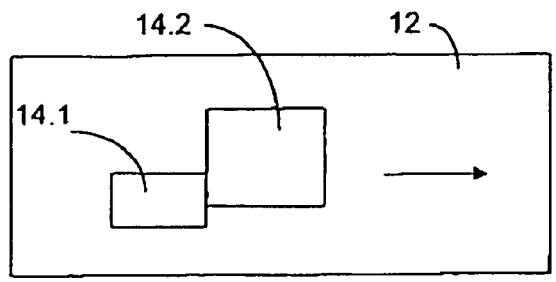

The dependency of the scale value on the transport speed fg is shown in FIG. 2. Below transport speed fg1, a scale value of 1 is set. At a transport speed larger than fg1 and smaller than fg2, the scale value is 2, and at a transport speed larger than fg2 a scale value of 5 is set. The switching of the scale values takes place automatically so that, regardless of the transport speed fg, the length L and ultimately the volume will always be determined with the correct scale value and the required measurement accuracy.

In other embodiments of the invention, the external condition can be derived in other ways as will be explained with reference to FIGS. 3–6 and 7–9.

Figure 5:
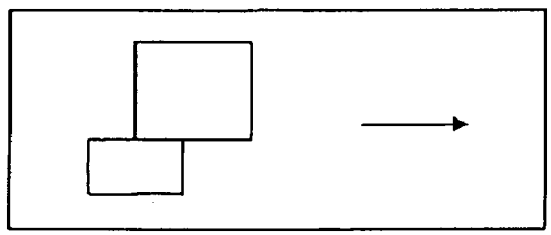
Figure 6:
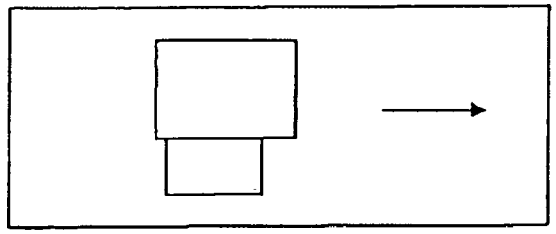
Figure 7:
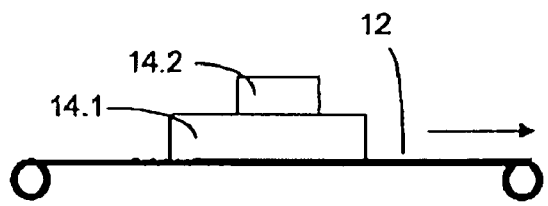
FIGS. 7–9 are side views which show arrangements of the goods on the conveyor.
Figure 8:
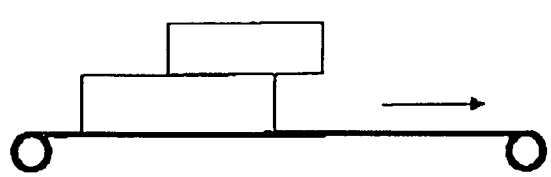
Figure 9:
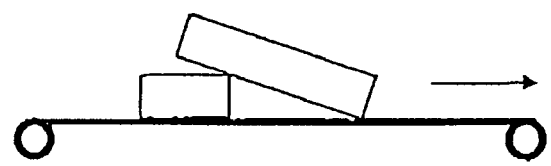

For example, the volume of packages 14.1 and 14.2 being transported by conveyor 12 can be measured without problem and with a constant measurement accuracy when the packages are being delivered separately and at an interval from each other, i.e. individually. In reality, however, packages often touch each other, as is shown for example in FIGS. 3–6. Packages 14.1 and 14.2 of FIGS. 3 and 4 touch and those of FIGS. 5 and 6 are side by side. The packages can also lie on top of each other, as is shown in FIGS. 7 and 8. The arrangements of FIGS. 7 and 8 show stacked and those of FIG. 9 show leaning package arrangements.

If one of these situations occurs, it is difficult for the sensor to recognize the individual packages 14.1 and 14.2 and the measurement is correspondingly poor. In the already mentioned German patent publication DE 02 26 663, a method is described for recognizing individual packages under such conditions and measuring them separately. However, the measurement will not have the same accuracy as when the packages are separate from each other.

Therefore, when one of these conditions occurs, i.e. one of these external conditions of touching, stacked, etc., the scale value is switched in accordance with the invention as a function of the external condition.

It is conceivable that, for example, the touching condition is assigned a different scale value than the stacked condition, and the latter, again, is given a different scale value than the leaning condition.

Furthermore, the external condition can be derived from the form of the delivered goods. Thus, for example, square-shaped luggage can be measured with higher measurement accuracy than bags with an irregular external form, so that the scale value is adjusted in accordance with the invention as a function of the external shape of the goods.

Since the sensor of the present invention has means 28 of recognizing the external condition, the sensor 10 can be automatically switched to a particular desired measurement accuracy, i.e. to the corresponding scale value in the certified system. The means 28 of recognizing the external condition are described in detail in the earlier mentioned DE 102 26 663 publication and comprise, for example, the recognition of the position and/or shape of the delivered goods. The essential part of these means 28 of recognition is intelligent software which can evaluate the reflections of the scanning light beam.

What is claimed is:

1. A method of operating an optical sensor for measuring a physical quantity of an object by means of a defined scale value subject to a calibration certification, comprising establishing a measurement accuracy for the quantity being measured in dependency of at least one external condition, using a scale value for measuring the quantity as a function of a desired measurement accuracy, and switching the scale value in response to a change in the measurement accuracy caused by the at least one external condition.

2. A method according to claim 1 including deriving the external condition from a geometrical property of the object.

3. A method according to claim 1 including deriving the external condition from a position of the object.

4. A method according to claim 1 including manually entering the external condition into the optical sensor.

5. A method according to claim 1 including recognizing the external condition with the optical sensor.

6. A method according to claim 1 including automatically switching the scale value as a function of the external condition.

7. A method according to claim 1 including detecting at least one parameter representing the external condition and automatically switching the scale value in response to a defined change in the at least one parameter.

8. A method according to claim 7 wherein the parameter is a speed of a conveyor and the optical sensor measures at least one dimension of goods being delivered by a conveyor.

9. An optoelectronic sensor for measuring a physical quantity of an object comprising a detector for detecting a physical quantity in dimensional units of a calibratable scale value, and a switch for changing the scale value that is responsive to an external condition.

10. An optoelectronic sensor according to claim 9 wherein the switch automatically changes the scale value.

11. An optoelectronic sensor according to claim 9 including an arrangement for deriving the external condition from a geometrical property of the object.

12. An optoelectronic sensor according to claim 9 including an arrangement for deriving the external condition from a position of the object.

13. An optoelectronic sensor according to claim 9 including an arrangement for manually entering the external condition into the sensor.

14. An optoelectronic sensor according to claim 9 including an arrangement for automatically recognizing the external condition with the sensor.

15. An optoelectronic sensor according to claim 9 including an arrangement for detecting at least one parameter representing an external condition.

16. An optoelectronic sensor according to claim 15 wherein the sensor measures at least a length of goods being transported by a conveyor having a given transport speed, wherein the parameter is the transport speed of the conveyor.

* * * * *